United States Patent [19]
Yoshida et al.

[11] Patent Number: 4,983,238
[45] Date of Patent: Jan. 8, 1991

[54] METHOD FOR MANUFACTURING A THERMOPLASTIC CONTAINER WITH A LABEL

[75] Inventors: Masatsugu Yoshida, Yokohama; Seishiro Maruyama, Funabashi; Hiroshi Ezawa; Takayuki Watanabe, both of Yokohama; Hiroaki Tsushima, Kamakura, all of Japan

[73] Assignee: Mitsui Toatsu Chemicals, Inc., Tokyo, Japan

[21] Appl. No.: 261,407

[22] Filed: Oct. 24, 1988

[30] Foreign Application Priority Data

Oct. 22, 1987 [JP] Japan ................................ 62-265401
Nov. 2, 1987 [JP] Japan ................................ 62-275745
Nov. 2, 1987 [JP] Japan ................................ 62-275746
Dec. 7, 1987 [JP] Japan ................................ 62-307787

[51] Int. Cl.⁵ .............................................. B32B 31/26
[52] U.S. Cl. ...................................... 156/86; 156/217; 156/218; 156/244.11; 156/244.18; 156/244.24; 264/230; 264/342 R
[58] Field of Search ...................... 156/85, 86, 244.11, 156/244.24, 217, 218, 244.18; 264/229, 230, 342 R

[56] References Cited

U.S. PATENT DOCUMENTS

| 3,767,496 | 10/1973 | Amberg et al. | 264/342 R |
| 3,967,991 | 7/1976 | Shimano et al. | 264/342 R |
| 4,016,704 | 4/1977 | Fujio | 156/86 |
| 4,144,631 | 3/1979 | Fujio | 156/86 |
| 4,244,900 | 1/1981 | Heider | 264/230 |
| 4,463,861 | 8/1984 | Tsubone et al. | 264/230 |
| 4,486,366 | 12/1984 | Reddy | 264/342 R |

Primary Examiner—Caleb Weston
Attorney, Agent, or Firm—Burns, Doane, Swecker & Mathis

[57] ABSTRACT

A sheet made from a foamed polystyrene resin which is heat-shrinkable in one axial direction and has a heat-insulatingness is prepared. A printing process is applied to this sheet to produce a label. A container made from a thermo-plastic resin is covered with said cylindrical label and is put in a furnace in order to heat-shrink the label to be fitted on the container.

The container with the label manufactured in accordance with the present invention has a superior heat-insulatingness, and thus can maintain the temperature of water contained therein for a longer time. Also, when it is used in a electronic-range, a temperature of an outer wall surface of the container can be prevented from increasing, and thus the container can be held by a bare hand even immediately after cooking.

23 Claims, 6 Drawing Sheets

METHOD FOR MANUFACTURING A THERMOPLASTIC CONTAINER WITH A LABEL

FIELD OF THE INVENTION

The present invention relates to a container provided with a label made from a heat shrinkable foam sheet. More specifically, the present invention relates to a container made from a thermoplastic resin provided with a label made from a heat shrinkable foam polystyrene sheet.

BACKGROUND OF INVENTION

When a container made from a thermoplastic resin is subjected to a process color printing on its outer surface, it is generally required to provide a part of the barrel portion of the container with a flat portion to which the printing is applied. Thus, it has only been possible to print, merely a simple stretching pattern on the outer surface of the container.

Often a heat-shrinkable film or sheet is used as a packing material for the container. However, when the film or sheet is subjected to printing and is heat-shrunk onto the container, irregular strains are created on the film or sheet. Thus, merely a simple stretching pattern which permits a slight shift of the position of the stretching pattern can be printed on the film or sheet.

Further, in recent years, many microwavable food containers have been developed, but none of the containers have a printed indication on the outer surface thereof. Also, during cooking of food stuffs in an microwave oven the container is heated to a high temperature due to heated food stuffs, and thus cannot be held with a bare hand, and therefore is inconvenient to be taken out from the microwave oven.

A heat-insulating container which is able to have a high-grade printing on the outer surface thereof has been desired which can list the contents of the food stuffs contained in the container and thus create added values to the container.

In the past, a heat-insulating container was made by adhering a heat-insulating sheet made from a foam sheet was adhered to the outer surface of the container.

The foam sheet has applied to the container, by the following method. The foam sheet is continuously extruded from an extruder while it is stretched, in a direction perpendicular to the direction of the extrusion to produce a sheet. The sheet is subjected to a printing process and then is cut along the direction of the extrusion to produce a long belt. Then, the longitudinal side edges of the belt parallel to the extrusion direction are continuously adhered to each other to produce a cylinder. The cylinder is cut to a desired length to produce a plurality of smaller cylinders. The container is covered with the cylinder and heated, and thus the cylinder is heat-shrunk and wrapped on the container. This method, however, has the following disadvantages.

As a result of an investigation by the inventors, it was found that a large percent of such containers have defects where the edges of the sheet were adhered to form a cylinder. One of the reasons causing the great percent defects may be the fact that since the belt is made round so that the longitudinal direction of the belt may conform with the central axis of the cylinder and the both side edges of the belt are adhered to produce the cylinder, the cylindrical belt will be subjected to a great restoring force tending to deform the belt from the cylindrical shape to the flat shape. However, the above reason is not enough to explain the large percent of defective containers. This is also apparent from the fact that, as will be described later in Comparison Example 1, even when the belt was cut out that the longitudinal direction of the belt is perpendicular to the extrusion direction to produce a rectangular belt and the both side edges of the belt parallel to the extrusion direction were adhered with each other to produce the cylinder, the defective adhesion was easily caused.

A process for cutting the cylinder and putting it on the container and heat-shrinking the cylinder is preferably performed on an on-line system connected with a process for making the cylinder. Most preferably, the process for cutting the cylinder and putting it on the container and heat-shrinking the cylinder is performed concurrently with the cutting of the foam sheet to the belt and the adhesion of the both side edges thereof. In this case, however, the defective adhesion results in a defective heat insulating container. In order to avoid this disadvantage, the following method without using the on-line system may come to mind. A long cylinder in which the defective portions have been eliminated is first wound on a reel; then re-wound from the reel, cut, and then placed on the container and heat-shrunk onto the container. In this method, however, a fold or crease is formed on the cylinder during the winding operation, and this fold can not be removed even after the heat-shrinkage of the cylinder on the container. Thus the appearance of the container will be extremely impaired, and thus the value of the container as an article of commerce will be decreased.

SUMMARY OF THE INVENTION

It is an object of the present invention to overcome the above-described disadvantages of the prior art and to provide an inexpensive and very valuable container having a heat-shrinkable label that can be provided with various printing patterns and to provide a novel method for manufacturing the same.

The above object is performed by a method which comprises the steps of:

making at least one container from a thermoplastic resin;

extruding a foam polystyrene sheet from an extruder and stretching the sheet in the direction of the extrusion to form a foam polystyrene sheet which can be shrunk in one axial direction by heating the same which has a thickness of from about 0.1 mm to about 1.0 mm and an expansion ratio of from about 2 to about 10;

cutting said sheet in directions substantially parallel with and perpendicular to said stretched direction respectively to produce a label;

forming said label in a cylindrical shape so that the direction in which the sheet was stretched corresponds to the circumference of the cylinder;

joining overlapped portions at both ends of said label to produce a cylinder having an inner diameter approximately equal to the outer diameter of the container and a length substantially the same as the height of said container when the label is heat-shrunk;

placing the cylindrical label over the container; and heating said cylindrical label and container to a temperature sufficient to cause the label to heat-shrink onto the container.

As used herein, the "label" made of resin can be a sheet made only from a foam polystyrene sheet, or a sheet made by laminating a foam polystyrene sheet and a film of the polystyrene and an olefin resin (for example, high density polyethyrene, low density polyethyrene, polypropyrene, a co-polymer of ethylene-vinyl acetate etc.). Also, the label has or has not a printed pattern thereon, and the cylinder means the label having a shape like a sleeve.

A method for manufacturing the container in accordance with the present invention is as follows:

The foam polystyrene sheet is extruded and stretched in the direction of extrusion to produce a sheet. Then, the sheet is cut in a direction substantially parallel to the extrusion direction and in a direction perpendicular to the extrusion direction. The label is formed into a cylinder such that the direction of stretching corresponds to the circumference of the cylinder. The overlapping portions of both side edges of the label are adhered. Hereafter "to adhere" means to join by heat-seal, ultrasonic-seal, high frequency-seal and seal by adhesive or solvent.

It has been found that the circumference of the cylinder, (i.e. the stretching direction of the sheet), is perpendicular to the extrusion direction, i.e. where the two side edges parallel to the extrusion direction are adhered to each other, the adhesion of the edges is defective.

Further, in order to prevent shift of the position of the label during heat shrinkage it is recommended that, in forming the sheet into a cylindrical shape, the circumferential length of the cylinder is smaller than the maximum circumference of the container, and the label is stretched in an amount of from about 0.1% to about 5.0% of its circumference during being placed onto the container, the outer wall surface of the container is adapted to be contacted with the inner surface of the cylinder in an area of at least about 1% of the height of the container. The container is then covered with the label, and the label is heat-shrunk to contact the container.

Further, in order to prevent shift of the label during heat shrinkage and fall off the label from the container after heat shrinkage, it is also recommended to use a container that it has a flange at an open end thereof, and an outer circumference at a portion adjacent the flange which is from about 0.1% to about 30% less than the maximum outer circumference of the container. Further, it is preferable that the axial distance between the maximum outer circumference portion and the flange portion is at least 1% of the height of the container.

Further, to prevent the cylindrical label from shifting relative to the container during the heat shrinking step, it is preferred that the container have at least one groove or projection about the circumference thereof. Further, at least two grooves or projections may be intermittently formed about the circumference of the container or at least one or two or more grooves or projections may extend continuously about the circumference of the container. When the grooves or projections are intermittently formed, the number thereof is preferably at least two in order to prevent the cylindrical label from shifting relative to the container during the heat-shrinking step.

The foam polystyrene sheet for use in accordance with the invention may be made by the following steps:
plastisizing polystyrene;
adding to the resin a foaming agent such as a chemical forming agent generated by heat-deposition of carbon dioxide or nitrogen gas etc. in amount of from about 0.05% to about 3.0% by weight, or adding an organic solvent having a low boiling point, for example, a hydrocarbon compound such as butane, pentane etc. or a hydrogen fluoride compound such as freon 11, 12, 114 etc. in an amount of from about 0.001 to about 0.07 mol/resin 100 g; mixing the components; and
extruding them from an extruder to the air.

Said polystyrene means general purpose polystyrene or copolymer of styrene and butadiene, acrylouitric, methatrylic acid, acrylic acid, or maleic anhydride etc.

When the sheet extruded from the extruder is stretched, the sheet becomes heat-shrinkable in the stretching direction.

The sheet preferably has the thickness of from about 0.1 mm to about 1.0 mm and an expansion ratio of from about 2 to about 10, more preferably a thickness of from about 0.2 mm to about 0.6 mm and the expansion ratio of from about 3 to about 8.

If the sheet thickness is smaller than about 0.1 mm, the sheet has less heat-insulating properties and when the container is covered with the cylindrical label, the label will be bent. To the contrary, if the sheet thickness is larger than about 1.0 mm, the difference between the curvatures of the inner surface of the sheet and of the outer surface of the sheet is increased, and thus when the cylindrical label is heat-shrunk, wrinkles or creases are created on the surface thereof.

Also, if the expansion ratio is less than about 2, the sheet will be broken in bending thereof and thus can not be formed into a cylindrical shape. Further, when the container is covered with such a cylindrical label, said label will be broken. Additionally, the heat-insulating properties of such a label is decreased since the heat-conductivity of such a label is increased.

If the expansion ratio is larger than about 10, a secondary foaming is increased during the heat-shrinkage of the label, resulting in an increased deformation of the label.

The heat-shrinkage factor of the sheet is determined by measuring the shrinkage of the sheet after it is immersed in an oil at 120° C. for 1 minute. Preferably, the heat-shrinkage factor is from about 30% to about 70% in the direction of stretching and from about −15% to about +15% (minus represents an elongation) in a direction perpendicular to the direction of stretching.

Printing may applied to the sheet if desired, further, the sheet can be cut parallel to and perpendicular to the stretching direction, namely extruding direction respectively, to thereby form a quadrilateral label. The printing may be applied after cutting of the sheet.

The label is formed into a cylinder such that the circumference of the cylinder corresponds to the direction of stretching. The overlapping portion of the ends of the sheet can then be adhered.

The sheet may be laminated with a polystyrene film to produce a laminated sheet. It is preferred that this polystyrene film be oriented in one axial direction. Preferably, the shrinkage factor of this polystyrene film is approximately the same as that of the foam polystyrene sheet.

Preferably, container made from the thermoplastic resin is employed. Such a container generally formed by injection-molding. However, it may be manufactured by applying a secondary processing to the sheet extruded through a die from the extruder by using a forming machine such as a vacuum forming machine, a compressed air forming machine, or a vacuumcompressed air forming machine. The container may be made from any materials suitable to the above-described forming process. For example, polypropyrene, polyethylene, polyethylene terephtalate, polycarbonate, polyamide, polystyrene etc. are recommended, and a resin having a thermal deforming temperature (defined by JIS K-6871) higher than 100° C. are particularly preferred.

In addition, a resin which does not fulfill the above-described conditions by itself only may be used by laminating such resin with a resin having a higher thermal deforming temperature.

The container may be a cup, bowl, bottle, can so on.

PREFERRED EMBODIMENTS OF THE PRESENT INVENTION

Figure 8:
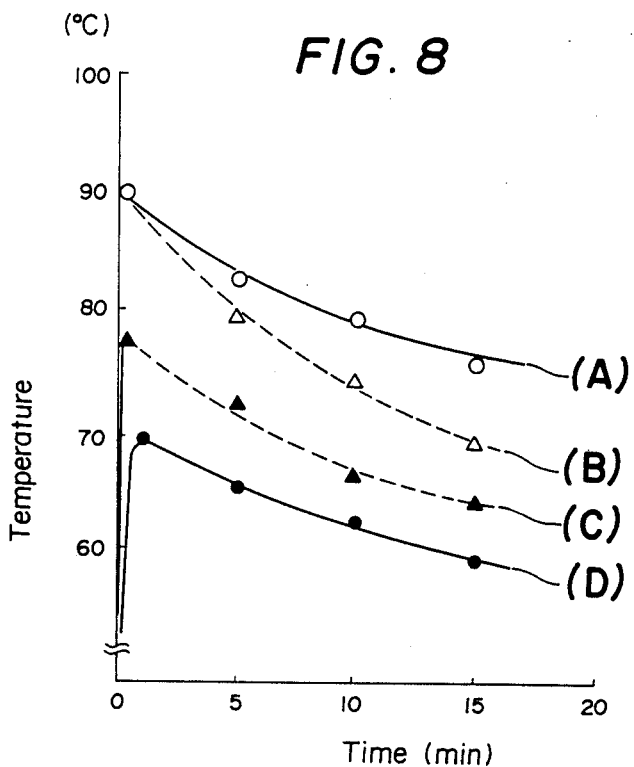
FIG. 8 is a graph showing a relation between the temperatures of both containers with the label manufactured according to the present invention and without the label and the time for which the containers were maintained.
Figure 9:
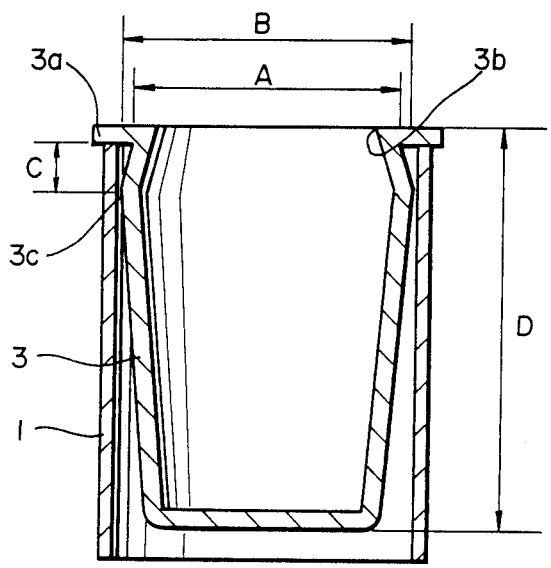
FIG. 9 is a longitudinal sectional view of another embodiment of the invention wherein a cylindrical label is applied the container having a flange at an open end thereof.
Figure 10:
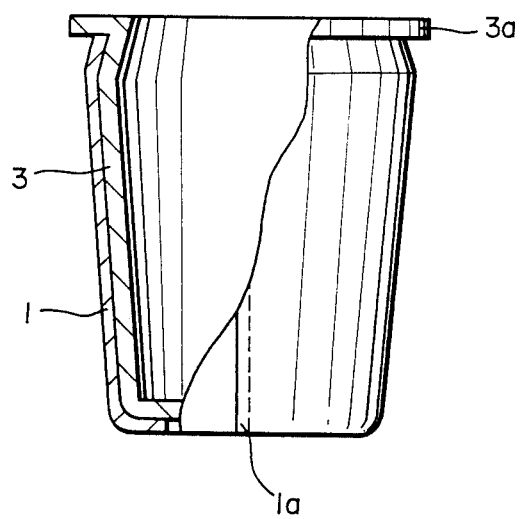
FIG. 10 is a schematic side view showing the label heat-shrunk in a furnace.

Referring to drawings, reference numerals 1 and 2 denote labels made from a foam polystyrene sheet, a suitable pattern of printing being applied on the sheet. 1a and 2a denote overlapped portions of two ends of the sheet, 3 denotes a container made from a thermoplastic resin, 3a denotes a flange portion of the container. FIG. 8 is a graph showing a relation between the temperatures of both containers with the label according to the present invention and without the label and the time to be maintained. The ordinate shows the temperature (°C.), and the absissa shows the time (min.) for which the container were maintained. In FIG. 8, (A) denotes a curve showing a transition of the temperature of water after the container with the label was filled with a pre-determined temperature of water, (B) denotes a curve showing a transition of the temperature of water after the container without label was filled with a pre-determined temperature of water, (C) denotes a curve showing a transition of the temperature of the outer wall surface of the container without label in which a pre-determined temperature of water was filled, and (D) denotes a curve showing a transition of the temperature of the outer-wall surface of the container with label in which a pre-determined temperature of water was filled. In FIGS. 9 and 10, 3a denotes a flange portion of container 3, 3b denotes an opening, and 3c denotes a portion of maximum diameter of container 3, respectively. Further, in FIGS. 11-22, 3d and 9a denote a grooves, 5a denotes a dent, and 4a, 6a, 7a, 8a, 10a and 11a denote projections formed on the outer surface of containers 4, 6, 7, 8, 10 and 11, respectively.

First, FIGS. 5-8 will be explained.

These drawings show sheet 1 made from a foam polystyrene sheet and formed in a cylindrical shape, the overlapped portions 1a of two ends of the sheets 1 being heat-sealed or adhered by adhesives. The above-described cylindrical label had a circumference smaller than the maximum circumference of the container 3. The sheet forming label 1 were elongated by about 0.1%-5.0% and then the labels 1 were covered over the container 3. The cylindrical labels 1 and the container 3 were contacted with each other along an area of at least 1% of the height of the container 3.

If the elongation of the sheet is smaller than 1%, during the heat-shrinkage step the label will be shifted in position relative to the container. If the elongation of the sheet is larger than 5.0%, the label can be injured or broken.

If the contact area between the cylindrical label 1 and the container 3 after the container was covered with the label 1 is smaller than 1% of the height of the container 3, then the label will be shifted in position relative to the container during the heat-shrinkage of the label.

Figure 6:
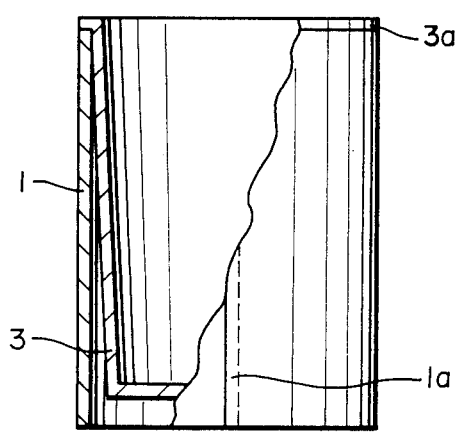
FIG. 6 is a side elevational and partly broken sectional view showing the container covered completely with the cylindrical label of FIG. 4.

In FIG. 6, the container 3 was forced into the cylindrical label 1 until the upper end of the label 1 abutted the lower surface of the flange 3a. In this case, the width of the contact area between the cylindrical label 1 and the container 3 is required to be greater than 1% of the height of the container.

Figure 7:
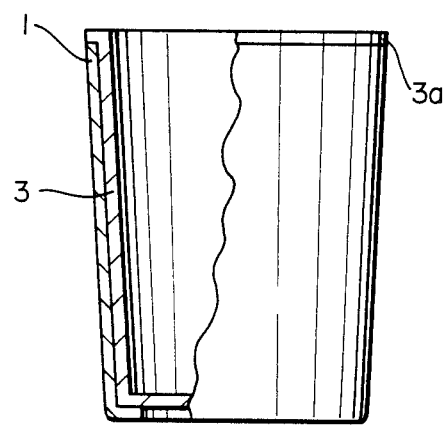
FIG. 7 is a schematic view of the container covered with the cylindrical label, the label being heat-shrunk in a furnace to thereby contact with the container throughout.

Then, when the container 3 covered with the cylindrical label 1 was put in a surface to heat-shrink the label 1, as shown in FIG. 7, the label 1 was fitted on the outer-wall surface of the container 3.

Then, the container 3 with the label and without the label each were filled with 250 ml of water having a temperature of 90° C. The relation between the temperature of the filled water and the surface temperature of the container was compared. This comparison shows that the outer wall surface temperature of the container with the label was lower than that of the container without the label, and thus the container with the label can maintain a higher temperature of water container therein, thus demonstrating a superior heat insulating properties.

FIGS. 9 and 10 shows another process of covering the container 3 with cylindrical label 1.

The opening 3b of the container 3 was provided with the flange 3a. The container 3 was formed in a manner that the length of the outer circumference A of the container 3 adjacent the flange 3a was smaller than that of the maximum outer circumference B of the container 3 approximately by 0.1% to 30%, and that the distance C between the maximum outer circumference portion 3c and the flange 3a was at least 1% of the height D of the container 3.

If the difference between the length of the outer circumference A of the container 3 adjacent the flange 3a provided around the opening 3b and that of the maximum outer circumference B of the container 3 was less than 0.1% of the maximum outer circumference B when the cylindrical label 1 i.e. sleeve was wrapped on the container 3 and was heat-shrunk, said label 1 can be detached from the flange 3a, so that the label 1 can not be attached in a pre-determined position on the container 3. On the contrary, if said difference between both lengths was more than 30%, when the label 1 was heat-shrunk on the container 3, the label 1 will come into uneven contact with the flange 3a.

Also, if the distance between the maximum outer circumference portion 3c and the flange 3a was less than 1% of the height D of the container 3, when the label 1 was heat-shrunk on the container 3, the label 1 can be detached from the flange 3a, so that the label 1 can not be attached in a pre-determined position on the container 3.

It is recommended that the length of the outer circumference A of the container 3 adjacent the flange 3a provided around the opening 3b is smaller than that of the maximum outer circumference B of the container 3 between the maximum outer circumference portion 3c and the flange 3a is within from about 5% to about 20% of the height D of the container 3.

Thus, when the sleeve-shaped label 1 into which the container 3 was inserted was heat-shrunk, as shown in FIG. 10, the label 1 was wrapped in a pre-determined position on the outer surface of the container 1.

EXAMPLE

This method will be explained by way of example.

EXAMPLE 1

Figure 1:
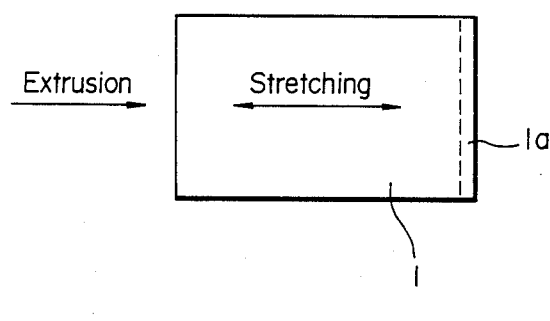
FIG. 1 shows a relation between the extrusion direction of the sheet and the stretching direction of the sheet according to the present invention.
Figure 2:
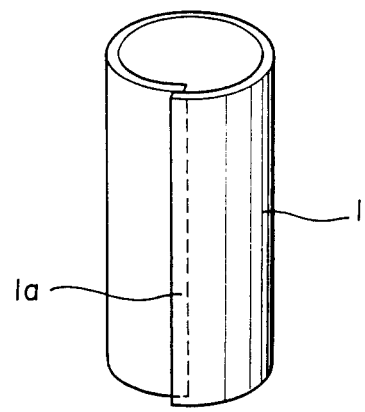
FIG. 2 shows a process for forming a cylinder from a sheet.

Referring to FIG. 1, a rectangular label 1 (length=95 mm, width=290 mm, thickness=0.3 mm, expansion ratio=4) made from a foam polystyrene sheet and stretched in the extrusion direction was prepared. Both sides perpendicular to the extrusion direction were adhered by heat-sealing to produce a cylinder, as shown in FIG. 2. A cup-shaped container made from polyplopyrene (inner diameter=90 mm, height=80 mm) was covered with this cylinder and was put in a furnace having the inside temperature of 200° C. for 2 seconds. The cylinder was heat-shrunk into adherence with the container. One hundred such heat-insulating containers were manufactured. These containers were tested and no defective cylindrical label were detected.

COMPARISON EXAMPLE 1

Figure 3:
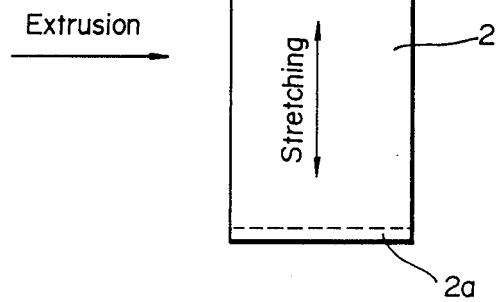
FIG. 3 shows a relation between the extrusion direction of the sheet and the stretching direction of the sheet in a comparison example.
Figure 4:
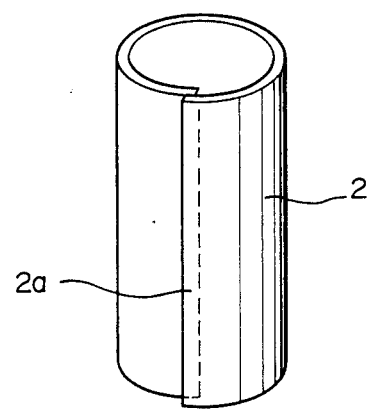
FIG. 4 shows a process for forming from a sheet FIG. 3.

Referring to FIG. 3, a rectangular label 2 (length=95 mm, width=290 mm, thickness=0.3 mm, expansion ratio=4) which was made from a foam polystyrene sheet and stretched perpendicularly to the extrusion direction was prepared. Both sides parallel to the extrusion direction were adhered in a manner similar to in Example 1 to firm a cylinder as shown in FIG. 4. One hundred insulating containers were manufactured in the manner set forth in Example 1. These containers were tested and 15 containers were found to be defective. Specifically adherence of the side edges was poor and were separated in 15 containers.

EXAMPLE 2

A general purpose polystyrene mixed with freon 0.025 mol per 100 g of polystyrene extrude from the extruder stretching in the extrusion direction to produce a foam polystyrene sheet, which had the thickness of 0.3 mm, the expression ratio of 5.5, the shrinkage factor in the stretching direction of 60%, and a shrinkage factor in the direction perpendicular to the stretching direction of +5%. An impact resistant polystyrene film (shrinkage factor=55%) which was oriented in one axial direction and had the thickness of 0.02 mm was prepared. The foam polystyrene sheet was laminated with an impact resistant polystyrene film, with the stretching directions of them being the same to thereby produce a laminated sheet. This laminated sheet was cut and cylindrically formed or shaped so that the extrusion direction corresponded to the circumference of the cylinder. The overlapped portion of the two ends of the sheet was heat-sealed to form a cylindrical label having the inner diameter of 89 mm.

Figure 5:
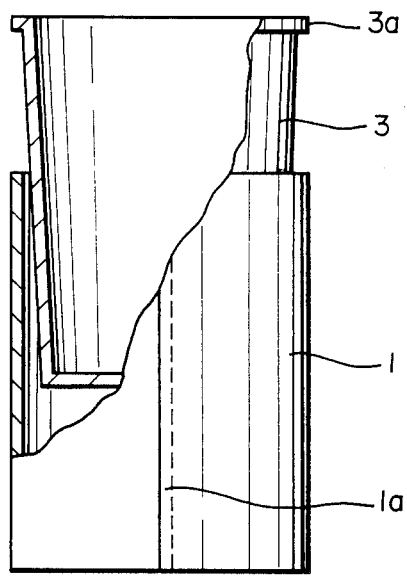
FIG. 5 is a schematic view showing a process of covering the container with the cylindrical label.

Then, as shown in FIG. 5, a cup-shaped container 3 (the height is 80 mm, the flange outer diameter is 96 mm, the bottom outer diameter is 70 mm) made from polypropyrene and having the maximum outer diameter of 90 mm in its barrel portion was covered with or inserted into said cylindrical label 1, and the upper end face of the label 1 was abutted with the flange 3a. The contact area between the inner surface of the cylindrical label 1 and the outer surface of the container 3 was made along the width of 5 mm. When the container with the label was put in the furnace to be heated, the label was shrunk without causing any shift in position relative to the container, as a result of which, the label was attached to the container at the desired position thereof.

EXAMPLE 3

The cylindrical label having an inner diameter of 86 mm was formed by using a foam polystyrene sheet having a thickness of 0.65 mm and the expansion ratio of 5. A cup-shaped container (height of 80 mm) made from polypropyrene and having a maximum outer diameter of 90 mm on the barrel portion thereof was covered with the cylindrical label, and the upper end of the label was abutted against the flange. The width along which the inner surface of the cylindrical label contacts with the outer surface of the container was 15 mm. The container with the label was put in the surface, the inside temperature of which was 130° C. In this case, the sheet was heated and shrunk without causing any shift in position relative to the container, as a result of which, the label was wrapped to the container at the desired position thereof.

EXAMPLE 4

The laminated sheet same as Example 2 was formed to the cylinder 1 having the inner diameter of 92 mm.

In the container shown in FIG. 9, the portion adjacent to the lower surface of the flange 3a has an outer diameter A of 90 mm, and a maximum outer diameter B of the barrel portion is 91 mm, and the distance C between the opening 3b and the portion 3c of maximum diameter is 15 mm, and a neck-in is formed at the portion shown by C.

A cup-shaped container 3 (the height is 80 mm, the outer diameter of flange is 96 mm, the bottom outer diameter is 70 mm) made from polyplopyrene was covered with the above-described cylindrical label 1, and the upper end face of the label 1 was abutted with the flange 3a (FIG. 9). In this state, the container with the label was put in the furnace, within which it was maintained at the temperature of 130° C. for 5 seconds, resulting in the heat-shrinkage of the label 1. This label 1, as shown in FIG. 10, was shrunk without departing from the surface of the flange 3a of the container, as a result of which the label was attached to the container at the desired position thereof.

EXAMPLE 5

Figure 11:
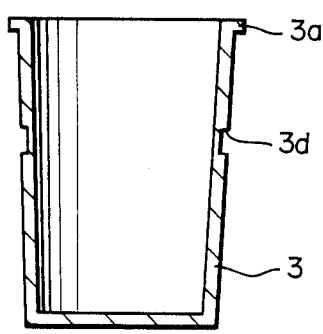
FIG. 11 is a longitudinal sectional view showing another embodiment of the container according to the present invention, wherein the container is provided with a groove about the circumference thereof in order to prevent the cylindrical label from falling off the container.

The container 3 covered with the label 1, same as Example 2 as shown in FIG. 11, had a groove 3d about the outer circumference thereof. The optimum size of said groove 3d depends upon the size and shape of the container 3 and the thickness of the label etc., and thus is difficult to be specified. In general, however, it is preferred that the width measured in a direction of the height of the container is within 3 mm-5 mm and the maximum depth is within 1 mm-5 mm.

Figure 12:
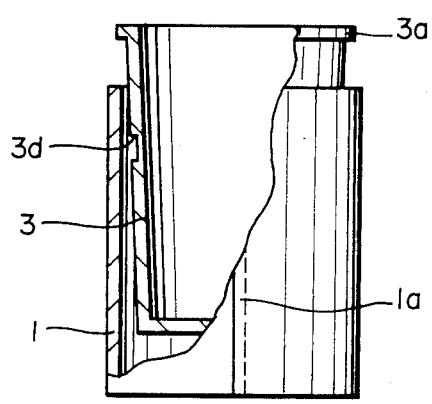
FIG. 12 is a schematic partially broken side view showing a container of FIG. 13 being covered with the cylindrical label.
Figure 13:
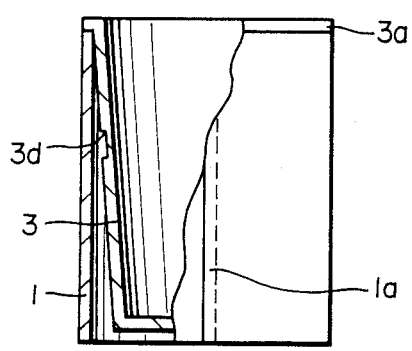
FIG. 13 is a partially broken schematic side view showing the label which has been heat-shrunk in a furnace.
Figure 14:
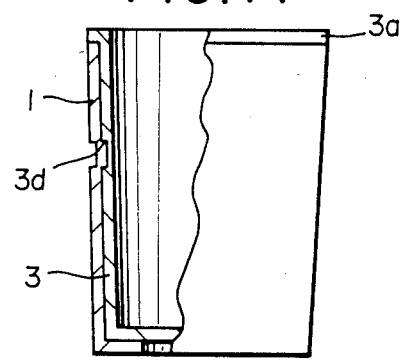
FIG. 14 is a schematic partially broken side view of the container of FIG. 13, which has completely covered with the label heat shrunk in a furnace.
Figure 15:
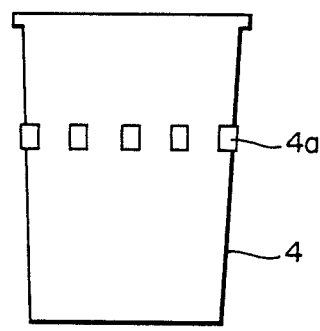
FIGS. 15-22 are schematic side views of the containers of the other embodiments of the present invention, respectively.
Figure 16:
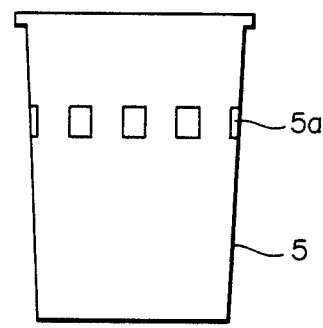
Figure 17:
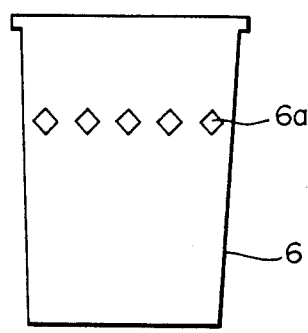

Then, the container 3, as shown in FIG. 12, was covered with the cylindrical label 1, and the upper end face of the label 1 was abutted with the lower surface of the flange 3a as shown in FIG. 13, and in this state, the container with the label was put in the furnace and heated, as a result of which, the label was securely attached on the outer surface of the container 3 as shown in FIG. 14.

When the cylindrical label 1 was made from the foam polystyrene sheet having a thickness of 0.3 mm and an expansion ratio of 4, and the container 3 is made from a polypropyrene sheet, it is preferred for the composite body to be heated to a temperature of 130° C. for 1 second.

When the cylindrical label 1 was heat-shrunk, a part of the sheet material entered or was forced into the groove 3d formed on the outer circumference of the container 3, so that the label was securely attached to the outer circumference of the container 3 without using any adhesive or solvent. Also, even if the label 1 had been attached in a deformed state to the container resulting in an inferior good, since label 1 could be easily removed from the container 3, and the container 3 could be re-used.

FIGS. 15-22 shows further examples respectively. The container 4 shown in FIG. 15 has a plurality of rectangular projection 4a provided on the outer surface of the container 4, said projections being arranged along the circumference of the container at a pre-determined distance from adjacent projections. The containers 5 and 6 shown in FIGS. 16 and 17 respectively have a plurality of rectangular dents 5a and 6a instead of the above-described projections on the outer circumferential surface thereof.

Figure 18:
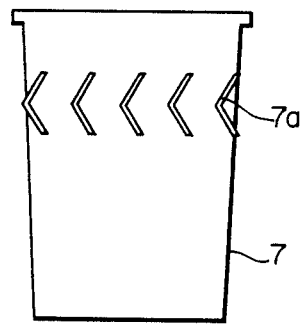
Figure 19:
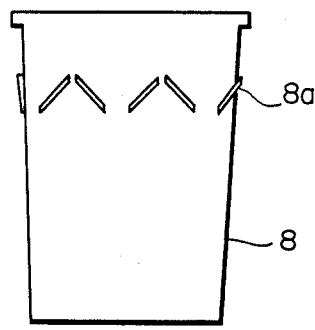
Figure 20:
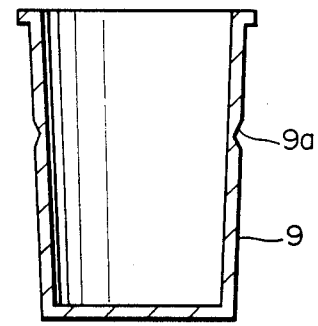
Figure 21:
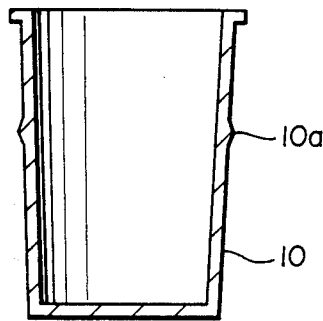
Figure 22:
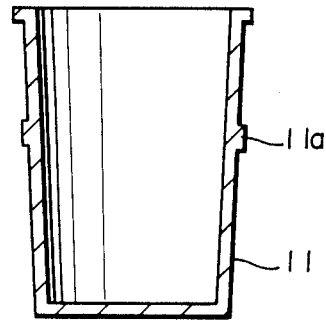

The container 7 shown in FIG. 18 similarly has a plurality of projections 7a having a shape like a boomerang. The container 8 shown in FIG. 19 has a plurality of linear projections 8a arranged in a pattern like a chain of mountains. The container 9 shown in FIG. 20 has a groove 9a having a triangular cross section. The containers 10 and 11 shown in FIGS. 21 and 22, respectively, have a line of projections 10a and 11a which have a triangular cross-section and a rectangular cross-section, respectively.

When these containers were covered with the cylindrical label and put in the furnace and heated, a part of the sheet material was forced in the dents or grooves, or was fitted over the projections, and thus, the label was securely attached to the container without falling off the container. Also, even if the label was attached in a deformed state to the container so that it might result in an inferior good, since this label can be easily removed from the container, this container can be re-used.

COMPARISON EXAMPLE 2

A cylindrical label was made by a using a method similar to that used in Example 2 except that sodium bicarbonate/citric acid of 0.3% in weight was used instead of freon, and the foam sheet had an expansion ratio of 1.9 and a thickness of 0.3 mm. A container was covered with this label. At this time, the sheet material was folded, resulting in crack extending about the circumference of the label. During heating of the label, the cracked portion extended to become a large split.

COMPARISON EXAMPLE 3

A cylindrical label was made by using a method similar to that used in Example 2 except that 0.06 mol freon per 100 g of resin were added to the resin. The foam sheet had a thickness of 0.95 mm and an expansion ratio of 11. A container was covered with this label. In heating the label, the label expanded prior to shrinkage thereof and was deformed and shifted in position. Thus it was impossible to secure the label at a pre-determined position.

COMPARISON EXAMPLE 4

A cylindrical label was made under conditions similar to those of Example 2 except that the label was made from the sheet having a thickness of 0.09 mm and the take-off speed of the sheet was greater than in Example 1. This label was deformed while covering the container, and thus could not be attached to a pre-determined position to the container.

COMPARISON EXAMPLE 5

A cylindrical label was made under the conditions similar to those of Example 2 except that the sheet had the thickness of 1.1 mm and the take-off speed of the sheet was less than in Example 2. This label became folded during the process of covering the container, and the fold could not be removed through heat-shrinkage of the label.

We claim:

1. A method for manufacturing a thermoplastic container with a label comprising:
   extruding a resin sheet and stretching said resin sheet in the direction of extrusion;
   cutting said sheet to a desired size to make a label;
   forming said label into a cylinder such that the circumference of said cylinder corresponds to the direction of stretching, said cylinder having a circumference less than the maximum circumference of the container;

placing the formed cylindrical label onto the container by applying sufficient force to stretch the portion of the label to be placed in contact with the area of maximum circumference of the container, wherein the circumference of at least a portion of the label remains less than the maximum circumference of the container; and heating said cylindrical label to a temperature sufficient to heat shrink the label into adherence with the container.

2. The method of claim 1 wherein the extruded resin is a foam polystyrene resin.

3. The method of claim 1 wherein said sheet is extruded to a thickness of from about 0.1 mm to about 1.0 mm.

4. The method of claim 1 wherein said extruded sheet has an expansion ratio of from about 2 to about 10.

5. The method of claim 2 wherein said extruded sheet has a thickness of from about 0.1 mm to about 1.0 mm and an expansion ratio of from about 2 to about 10.

6. A method of claim 2 wherein said extruded sheet has a thickness of from about 0.2 mm to about 0.6 mm and an expansion ratio of from about 3 to about 8.

7. A method of claim 1 wherein said extruded sheet has a heat shrinkage factor of from about 30% to about 70% in the direction of stretching and heat shrinkage factor of from about −15% to about +15% in the direction perpendicular to the direction of stretching.

8. A method of claim 1 wherein said forming step includes the step of applying an adhesive to the overlapping side edges of said sheet.

9. A method of claim 1 wherein said forming step includes the step heat-sealing the overlapping side edges of said sheet.

10. The method of claim 1 wherein said sheet is formed by polymerizing or co-polymerizing a resin, plasticizing said resin, mixing said resin with a forming agent and extruding the mixture.

11. The method of claim 10 wherein said resin is selected from the group consisting of polystyrene, butadiene, acrylonitrile, methacrylic acid, acrylic acid, maleic anhydride and atyrene.

12. A method of claim 1 wherein during the step of placing the cylinder onto the container, at least a portion of said cylinder is stretched from about 1% to about 5% about its circumference.

13. A method of claim 12 wherein after said cylinder is placed onto the container, said cylinder engages the container over an area of at least 1% of the height of the container.

14. A method of claim 1 wherein the container has an open end portion having a flange adjacent thereto.

15. A method of claim 14 wherein the container has a frustroconical shape.

16. A method of claim 14 wherein the container at the portion adjacent said flange is pinched inwardly so that the circumference of the container at the portion adjacent said flange is from about 0.1% to about 30% smaller than the maximum outer circumference of the container.

17. The method of claim 16 wherein the axial distance between the maximum outer circumference portion of the container and said portion adjacent said flange is at least 1% of the height of the container.

18. The method of claim 1 wherein the container has at least one groove or projection about the circumference thereof to prevent the cylinder from shifting relative to the container during the heat shrinking step.

19. The method of claim 18 wherein said groove or projection extends continuously about the circumference of the container.

20. The method of claim 18 wherein said groove or projection extends intermittently about the circumference of the container.

21. The method of claim 1 wherein said sheet is laminated with a film.

22. The method of claim 21 wherein said film is polystyrene and has been stretched in one direction.

23. The method of claim 1 wherein the container has a frustroconical shape and said cylinder has a circumference slightly less than the maximum circumference of the container and wherein during the step of placing said cylinder on the container, said cylinder is stretched to fit the shape of said container and stretches about and engages the container.

* * * * *